United States Patent [19]

Blachman

[11] 4,394,705
[45] Jul. 19, 1983

[54] ANTI-STATIC HOSE ASSEMBLIES

[75] Inventor: Lawrence P. Blachman, Reading, Pa.

[73] Assignee: The Polymer Corporation, Reading, Pa.

[21] Appl. No.: 336,711

[22] Filed: Jan. 4, 1982

[51] Int. Cl.³ .............................................. H05F 3/00
[52] U.S. Cl. ...................................... 361/215; 174/47
[58] Field of Search .......................... 361/215; 174/47

[56] References Cited

U.S. PATENT DOCUMENTS

| | | | |
|---|---|---|---|
| 3,070,132 | 12/1962 | Sheridan | 361/215 X |
| 3,828,112 | 8/1974 | Johansen et al. | 361/215 X |
| 4,059,847 | 11/1977 | Phillips et al. | 361/215 |

Primary Examiner—Reinhard J. Eisenzopf
Attorney, Agent, or Firm—Richard O. Church

[57] ABSTRACT

A hose assembly of limited conductivity designed to dissipate static electric charges, such as encountered in paint spraying. The hose assembly includes a reinforced hose 1 fitted over the nipple 15 of a stem 13, and a shell 14 holding the hose 1 in compression over the nipple 15 of the stem 13. The novel element is a stripe of conductive polymer 11 in the cover 9 of the hose 1 extending from the static drain 7 to the surface of the hose 1. When the shell 14 is compressed over the hose 1, the conductive stripe 11 is seated and held in secure electrically conducting relationship with the inner diameter of the shell 14.

6 Claims, 2 Drawing Figures

4,394,705

ANTI-STATIC HOSE ASSEMBLIES

TECHNICAL FIELD

This invention relates to anti-static hose assemblies in which the hose is provided with a conductive element for draining static electric charges. More particularly, this invention relates to methods and means for establishing electrical continuity between the conductive element of a hose and the fittings attached to a hose assembly.

DEFINITIONS

The term "tube" as used herein, refers to a flexible, polymeric, tubular inner component of a hose that serves as an impervious conduit for the transmission of fluids.

The term "reinforcement" as used herein, refers to one or more plies of high tenacity synthetic yarns or metal wires that are applied in tensioned relationship (as by spiral wrapping, braiding, knitting, or the like) over the tube to increase the burst strength and kink resistance of the tube.

The term "cover" as used herein, refers to a continuous protective layer of polymeric material that envelopes the reinforcement.

The term "hose" as used herein, refers to a composite structure adapted for the transmission of fluids under pressure which includes a tube, a reinforcement, and a cover.

The term "fitting" is used herein to mean a metal fixture that, when secured to a free end of a hose, will facilitate connecting the hose in fluid sealing relationship with a tool, another conduit, a working chamber or the like. Fittings in general use in the hydraulic hose industry consist of a stem which is inserted into the bore of the hose, and a compression element called a shell that clamps the hose over the stem. Shells include, for example, hose clamps, tubular members which are crimped or swaged over the hose, and internally threaded members into which the stem can be screwed to compress the hose over the stem. In a preferred fitting, the stem and the shell are mechanically interlocked either prior to or during assembly to the hose.

The term "hose assembly" is used to mean a hose to which fittings have been attached.

BACKGROUND ART

There are many applications in which a flexible high-pressure thermoplastic hose is used for the transmission of volatile or combustible fluids. Since the materials from which hoses are generally manufactured (i.e., rubber or synthetic polymers) are essentially non-conductive, it is a common practice in these applications to incorporate an element of at least limited conductivity within the body of the hose to permit grounding of the hose and the dissipation of static electric charges. A typical application is a paint spray hose in which paints or lacquers are pumped through a flexible hose to a spray gun at relatively high pressures. In some recently developed commercial installations, the pressures may reach as much as 700 kg/cm$^2$. The flow of fluid materials through the hose may cause static electric charges to build up which, if not discharged to ground, can lead to sparking and explosion of the volatile solvents or other paint vehicles.

To avoid the danger of explosion and fire when inflammable fluids are transmitted through the thermoplastic or rubber innertube of a hose, it is conventional to incorporate a conductive element, herein termed a static drain, within the wall of the hose. These static drains variously have been in the form of sinuous wires, both single strand and braided, helically wound conductive wires, and flexible conductive elements made by interweaving elastic yarns and copper threads. U.S. Pat. No. 3,828,112 discloses the use of an extrusion or tape of semi-conductive synthetic resin and U.S. Pat. No. 4,059,847 discloses the use of a conductive layer of carbon particles laid down within the hose to provide conductivity. In the case of traditional wire reinforced, rubber hose, the wire reinforcement is itself the static drain.

Some of these construction are not entirely satisfactory because the high pressures, repeated pressure pulses or tight bends and flexing which occur in use, may cause the static drain to break from stress fatigue, overstraining and the like. Since the static drain is usually imbedded within the hose, a discontinuity in the static drain is not observable and the resistance of the hose must be periodically checked to be sure the static drain is functional. A less serious problem results from the fact that the free ends of a ruptured wire, if used as the conductive element, may penetrate the cover of the hose and cut the hand of a worker.

It is necessary to ground the static drain to the fitting and this is usually done by use of an intermediate electrical connector. One kind of connector is disclosed in copending application Ser. No. 307,843 of common assignee filed on Oct. 2, 1981. This application discloses the use of a metal ring which is slipped over the nipple of the stem. One side of the ring is seated against a shoulder on the nipple and the other side has a number of upstanding tines (prongs) which embed themselves between the tube and the cover of the hose and engage the static drain. A brad driven into static drain at the end of the hose is another example of an intermediate connector and a further varient is a coating of conductive paint covering the ends of the hose.

These and other devices for grounding the static drain to the fitting are all objectionable because they add to the cost of the hose and they are not completely reliable. Cost is added because of the intermediate connector itself and the manipulative step that must be performed to orient the connector on the hose or the stem. Conductivity may be lost if the connector is not properly assembled and, even if properly assembled, the connector may lose contact with the fitting as by cold flow or creep of the material of the hose.

DISCLOSURE OF THE INVENTION

Accordingly, it is an object of this invention to provide a hose assembly that may be grounded to prevent the accumulation of static electric charges.

It is a further object of this invention to provide an anti-static hose that can withstand considerable abuse, including damage to the static drain, without loss of conductivity.

A further object of this invention is to provide a simple and effective means of grounding the static drain to the fitting that will maintain electrical continuity under virtually all conditions of use.

These and other objects of this invention are achieved by utilizing a cover comprised of a non-conductive polymer and a stripe of a conductive polymer extending through the non-conductive cover along the length of the hose. The inner diameter of the conductive stripe contacts a subjacent static drain and the outer diameter of the stripe contacts the hose fitting. This static drain may be a conductive reinforcement layer or a layer of conductive polymer over the outermost reinforcing layer. When a fitting is attached to the hose, the stripe of conductive polymer is compressed against the shell, eliminating the need for an intermediate connecting device. Moreover, if the stripe is damaged or cut anywhere along the length of the hose assembly, the inner conductive element will provide a conductive path so that the overall change in conductivity of the assembly, if measurable, will be insignificant.

Most conveniently, the stripe will contain carbon black and will therefore be black in color. The non-conductive portion of the cover may be pigmented in any desired color with the black stripe providing both an attractive appearance and a simple, visual means of identifying a conductive hose.

In a preferred form of this invention, a layer of conductive polymer is coextruded with the non-conductive cover to form an integrated structure comprised of the inner static drain, the cover, and the conductive stripe extending through the cover to the static drain. This structure is formed in a coextrusion die in which an inner annular orifice feeds the layer of conductive polymer and an outer annular orifice feeds a non-conductive polymer. A sector of the outer orifice is blocked and a matching sector is opened in the inner orifice to extrude the stripe of conductive polymer.

DESCRIPTION OF THE DRAWINGS

The invention can better be understood by reference to the accompanying drawings in which

In FIG. 1 there is shown a hose 1 comprised of a tube 3, one or more layers of reinforcing yarns 5, and a cover comprised of a static drain 7 and an outer non-conductive layer 9. A conductive stripe 11 is formed internally with the static drain 7 extending through the cover 9 to the outer surface of the hose 1.

Figure 1:
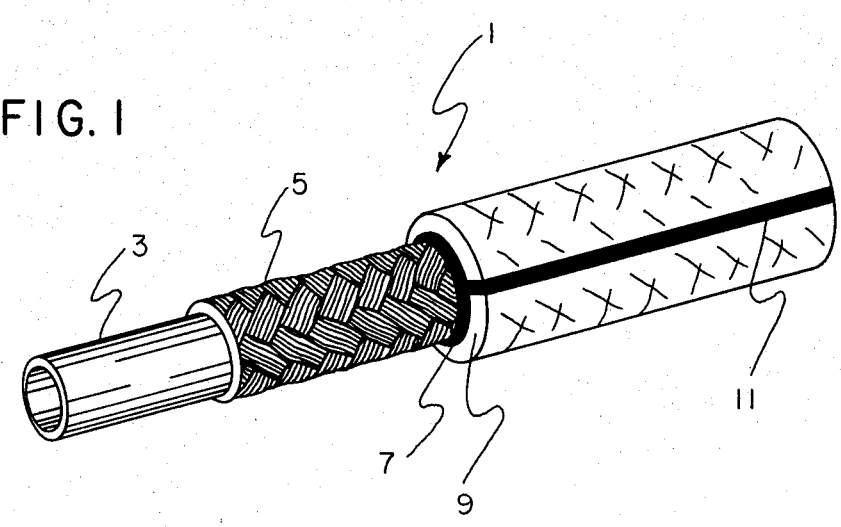
FIG. 1 is a schematic view of the hose of this invention partially cut away and, FIG. 2 is an expanded view illustrating how the hose is attached to a fitting.
Figure 2:
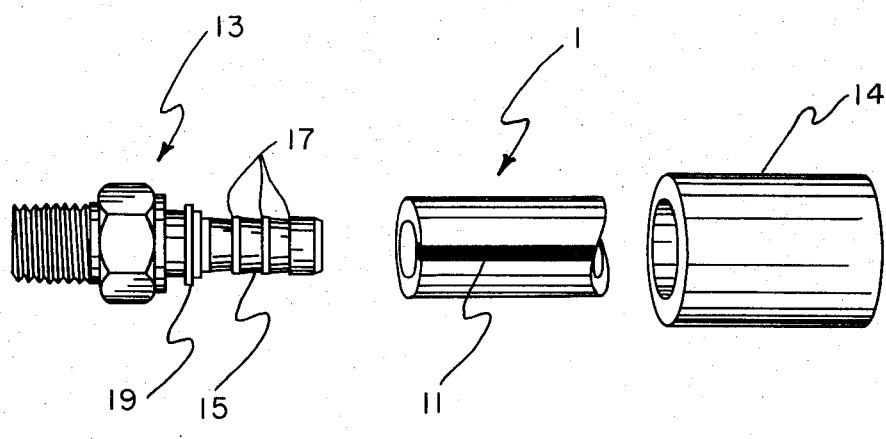
In FIG. 2 there is illustrated a fitting comprising a stem 13 and a shell 14. The stem 13 includes a shoulder 19, a nipple 15 and barbs 17. In practice, the nipple 15 is inserted into the inside diameter of the hose 1 and the hose 1 is seated against shoulder 19. A shell 14 is positioned over the portion of hose 1 mounted on the nipple 15 and is then swaged or crimped. This mechanically locks the shell 14 to the shoulder 19 and compresses the hose 1 over the nipple 15 to secure the hose in sealing relationship with the nipple 15. When the shell 14 is compressed around the hose 1, it will be forced in electrical contact with the conductive stripe 11. Since the conductive stripe 11 is, in this construction, merely an extension of the static drain 7, the static drain 7 is grounded to the fitting by way of the stripe 11.

The various elements of the hose can be made from any of many conventional materials. For example, suitable materials for the inner tube 3 include nylons, fluorocarbons, polyesters or rubbers and are selected for the mechanical and chemical properties desired. Other suitable materials from which the tube may be made, depending upon the application, include thermoplastic elastomers such as polyurethane, styrene block copolymers, rubber modified olefins, ionomers and the like.

The reinforcing layer or layers are made from high tenacity yarns of which nylon and polyester are representative, or from high tensile steel wire.

The static drain is a polymeric material to which carbon black or other conductive filler has been added to achieve the desired level of conductivity. Generally, a hose assembly will be considered sufficiently conductive to dissipate static electric charges if its total resistance is less than $10^8$ ohms. While the length of the hose will vary from application to application, ordinary industrial uses usually do not require a hose longer than 30 meters and, therefore, a resistance less than $10^6$ ohms per linear 30 centimeters is an acceptable value for most applications.

The two layers that comprise the cover of the hose are preferably selected from polymeric materials that have melt compatability, that is, can readily be coextruded and form good bonds to each other. One such combination of materials is carbon filled polyurethane for the static drain and conductive stripe, and nylon or unfilled polyurethane for the outer non-conductive layer. When coextruded, these materials are almost inseparable and combine useful properties of flexibility, chemical resistance, and good abrasion resistance. While the exact amount is not critical, the addition of from about 5 to about 25% carbon black in the polyurethane will provide a desired level conductivity depending on the cross sectional area of the static drain and the stripe.

I claim:

1. An anti-static hose comprising:
   a tube which is a tubular component of the hose;
   a reinforcement which is high tenacity yarns applied in tensioned relationship over the tube;
   a static drain which is a conductive layer over the reinforcement; and,
   a cover which is a continuous protective layer of polymeric material enveloping the static drain and the reinforcement, the improvement comprising:
   a stripe of a conductive polymer extending through the cover and along the length of the hose, which stripe forms a portion of the outer surface of the cover and is in contact with the static drain.

2. An anti-static hose according to claim 1 in which the static drain is a metal wire reinforcement or conductive polymeric fibers.

3. An anti-static hose according to claim 1 in which the static drain is a conductive polymeric layer subjacent the cover.

4. An anti-static hose according to claim 3 in which the cover, the stripe and the static drain are coextruded.

5. An anti-static hose assembly according to claim 4 in which the stripe is formed as an integral part of the static drain.

6. An anti-static hose assembly comprising the anti-static hose of claim 1 and attached hose fittings that, when secured to free ends of hose, will facilitate connecting the hose in fluid sealing relationship with a tool, another conduit or a working chamber.

* * * * *